(12) United States Patent
Daniel

(10) Patent No.: US 6,997,471 B1
(45) Date of Patent: Feb. 14, 2006

(54) MULTI-HITCH APPARATUS AND METHOD

(76) Inventor: John D. Daniel, 8837 Chickamauga Dr., Milton, FL (US) 32583

( * ) Notice: Subject to any disclaimer, the term of this patent is extended or adjusted under 35 U.S.C. 154(b) by 0 days.

(21) Appl. No.: 10/859,847

(22) Filed: Jun. 3, 2004

(51) Int. Cl.
B60D 1/07 (2006.01)

(52) U.S. Cl. .................... 280/416.1; 280/511

(58) Field of Classification Search ........... 280/415.1, 280/416.1, 491.1, 491.3, 495, 498, 500, 511, 280/477, 478.1
See application file for complete search history.

(56) References Cited

U.S. PATENT DOCUMENTS

| | | | | |
|---|---|---|---|---|
| 2,872,213 A | * | 2/1959 | Hosford | 280/416.1 |
| 3,700,254 A | * | 10/1972 | Eck | 280/63 |
| 4,116,460 A | * | 9/1978 | Drower | 280/478.1 |
| 4,440,417 A | * | 4/1984 | Kirchner | 280/479.3 |
| 4,729,571 A | * | 3/1988 | Tienstra | 280/416.1 |
| 5,044,652 A | * | 9/1991 | Brisson | 280/416.1 |
| 5,158,316 A | * | 10/1992 | Hutchmacher | 280/415.1 |
| 5,890,727 A | * | 4/1999 | May | 280/416.1 |
| 5,915,714 A | * | 6/1999 | Bell et al. | 280/456.1 |
| 5,934,698 A | * | 8/1999 | Despain | 280/490.1 |
| 6,116,633 A | * | 9/2000 | Pride | 280/511 |

* cited by examiner

Primary Examiner—Anne Marie Boehler
(74) Attorney, Agent, or Firm—J. Nevin Shaffer, Jr.

(57) ABSTRACT

A multi-hitch apparatus and method includes a movable hitch attachment. More than one hitch is connected to the movable hitch attachment wherein the movable hitch attachment is movable between a first position and a second position. According to one aspect of the invention, the more than one hitch includes more than one ball hitch. According to a further aspect, the more than one hitch includes two ball hitches.

4 Claims, 4 Drawing Sheets

MULTI-HITCH APPARATUS AND METHOD

FIELD OF THE INVENTION

This invention relates to a multi-hitch apparatus and method. In particular, according to one embodiment, the invention relates to a multi-hitch including a movable hitch attachment with more than one hitch connected to the movable hitch attachment wherein the movable hitch attachment is movable between a first position and a second position.

BACKGROUND OF THE INVENTION

As long as there have been hitches, the need has existed for flexibility in using the hitch when appropriate. That is to say, there are many times when a hitch is not needed. Thus, there are a wide variety of removably attachable hitch mechanisms known in the art. As a result, when the need arises, the hitch is connected to a vehicle, for example only, and the hitch is put to the desired use. For example only and not by way of limitation, the owner of a boat attaches an appropriate hitch to his vehicle and then attaches the boat trailer to the hitch. In this way, as is known in the art, the hitch serves as the connection between the vehicle and the item being towed. Also, as is known in the art, when not in use, the hitch may be removed from the vehicle.

A difficulty arises when multiple items to be towed exist. The difficulty is that a wide variety of hitch sizes exist. That is to say, by way of example only, a boat trailer may utilize one size hitch while a motorcycle trailer may require another. Currently, it is necessary to engage in a labor-intensive process to remove one size hitch and to install another hitch of another size.

Additionally, there is a need with regard to safety vehicles and rescue vehicles to be as flexible as possible when providing assistance to others. Currently when a safety vehicle arrives on the scene of an accident, for example only, the safety vehicle may be equipped with a hitch that is the wrong size for the one that is needed. Here again, a time and labor-intensive process is currently required to change out one hitch for another. This is assuming that a second size hitch is even available.

Thus, there is a need in the art for providing an apparatus and method to enable users of hitches to quickly, easily, and conveniently switch between a variety of hitches at the spur the moment. It, therefore, is an object of this invention to provide a multi-hitch apparatus and method for enabling a user to quickly and easily switch between a variety of hitch devices.

SUMMARY OF THE INVENTION

A multi-hitch apparatus and method includes, according to one aspect of the invention, a movable hitch attachment. More than one hitch is connected to the movable hitch attachment wherein the movable hitch attachment is movable between a first position and a second position. According to one aspect of the invention, the more than one hitch includes more than one ball hitch. According to a further aspect of the invention, the more than one hitch includes two ball hitches.

In accordance with another embodiment of the invention, a multi-hitch apparatus includes a first arm movably connected to a support. A second arm is movably connected to the support. A first hitch is connected to the first arm and a second hitch is connected to the second arm. According to one aspect of this invention, the first arm and the second arm are connected. According to a further aspect of the invention, the first hitch is a ball hitch. According to another aspect, the second hitch is a ball hitch. According to a further aspect, the apparatus includes an arm securing device.

In accordance with another embodiment of the invention, a two ball hitch apparatus includes a first arm rotatably connected to a vehicle. A second arm is rotatably connected to the vehicle and to the first arm. A first ball hitch is connected to the first arm and a second ball hitch is connected to the second arm. According to another aspect of this invention, the apparatus further includes an arm immobilizing device. According to another aspect, the first ball hitch is of one diameter and the second ball hitch is of another diameter. According to a further aspect, the first ball hitch is of one diameter and the second ball hitch is of another diameter and wherein the ball hitch diameters are selected from a group including 1 and ⅞th inch diameter and 2 inch diameter.

In accordance with another embodiment of the invention, a movable hitch apparatus includes a first swing arm movably connected to a bumper of a vehicle. A second swing arm is movably connected to the bumper and spaced apart from the first swing arm on opposite sides of a towing location on the bumper. A first hitch is connected to the first swing arm and a second hitch is connected to the second swing arm. The first swing arm and a second swing arm are connected such that when moved either the first hitch or the second hitch is placed in the towing location. According to one aspect of this invention, the apparatus further includes a swing arm locking device conformed to lock the first swing arm and the second swing arm in a chosen position. According to one aspect of the invention, the first hitch is a ball hitch. According to another aspect of the invention, the second hitch is a ball hitch. According to a further aspect of the invention, the first hitch is one dimension and the second hitch is another dimension. According to a further aspect of this invention, the first hitch is a ball hitch of one dimension and the second hitch is a ball hitch of another dimension and wherein the dimensions are selected from a group including 1⅞ inch diameter ball hitches and 2 inch ball hitches.

According to a further aspect of the invention, a method for providing multiple hitches at a towing location includes the steps of movably connecting a first arm to a vehicle. Movably connecting a second arm to the vehicle. Attaching a first hitch to the first arm. Attaching a second hitch to the second arm. Moving the first hitch or the second hitch to the towing location and locking the first arm and the second arm from moving. According to a further aspect of this invention, the method further includes the step of connecting the first arm and the second arm together so that as one arm moves a hitch into the towing location the other arm moves the other hitch out of the towing location.

DESCRIPTION OF THE DRAWINGS

Other objects, features and advantages of the present invention will become more fully apparent from the following detailed description of the preferred embodiments, the appended claims and the accompanying drawings in which:

DETAILED DESCRIPTION OF THE INVENTION

Figure 1:
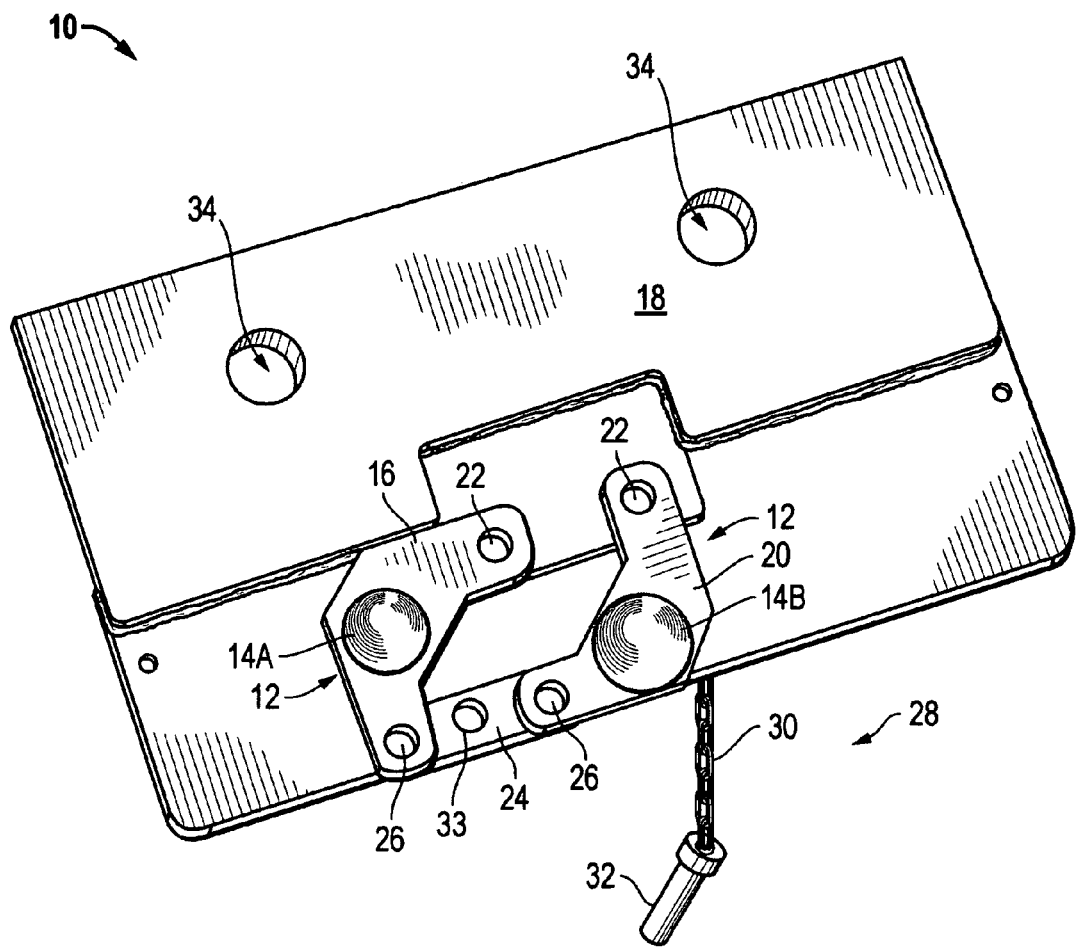
FIG. 1 is a top view of a multi-hitch apparatus of the present invention in a first position.

An embodiment of the present invention is illustrated by way of example in FIGS. 1–4. With specific reference to FIG. 1, the multi-hitch apparatus 10 of the present invention includes a movable hitch attachment 12. More than one hitch 14 is connected to movable hitch attachment 12. As will be disclosed and discussed more fully hereafter, movable hitch attachment 12 is movable between a first position and a second position. FIG. 1 shows hitches 14 to be ball hitches as is known in the art. Any other type of hitch 14 now known or hereafter developed is suitable for the purposes of the invention as well.

FIG. 1 also illustrates a feature of the invention wherein one hitch 14 is one dimension and the other hitch 14, as shown in FIG. 1, is another dimension. By way of further explanation, as shown in FIG. 1, one hitch 14A is 1⅞ inches in diameter and the other hitch 14B is 2 inches in diameter. Again, any dimension of hitch 14 now known or hereafter developed is contemplated by the invention.

FIG. 1 also illustrates an aspect of the mufti-hitch apparatus 10 wherein the movable hitch attachment 12 includes a first swing arm 16 movably connected to a support 18. Also illustrated is a second swing arm 20 also movably connected to support 18. Once again, by way of the movable attachment, by swing arm pins 22 or any other movable connection now known or hereafter developed, first swing arm 16 and second swing arm 20 are free to move from a first position to a second position.

FIG. 1 also illustrates another aspect of the invention wherein second swing arm 20 is movably connected to first swing arm 16 by means of hinge bar 24. The hinge bar 24 is movably connected to first swing arm 16 and second swing arm 20 by means of hinge bar pins 26. Once again, swing arm pins 22 and hinge bar pins 26 are any movable connection now known or hereafter developed such as, for example only and not by way of limitation, a bolt and nut combination, a bolt and cotter pin combination, or the like.

FIG. 1 further illustrates another aspect of the invention whereby immobilizing device 28 is connected to support 18. The immobilizing device 28, according to one aspect of the invention, includes a connection 30 and pin 32. As shown in FIG. 1, connection 30 is shown as a chain connecting pin 32 to support 18. Pin 32 cooperates with pin hole 33 in hinge bar 24 and support 18. When pin 32 is inserted in pin hole 33, movable hitch attachment 12 is immobilized by immobilizing device 28 such that second swing arm 20, to which 2 inch diameter hitch 14B is attached, is held in position for towing, for example only.

Figure 3:
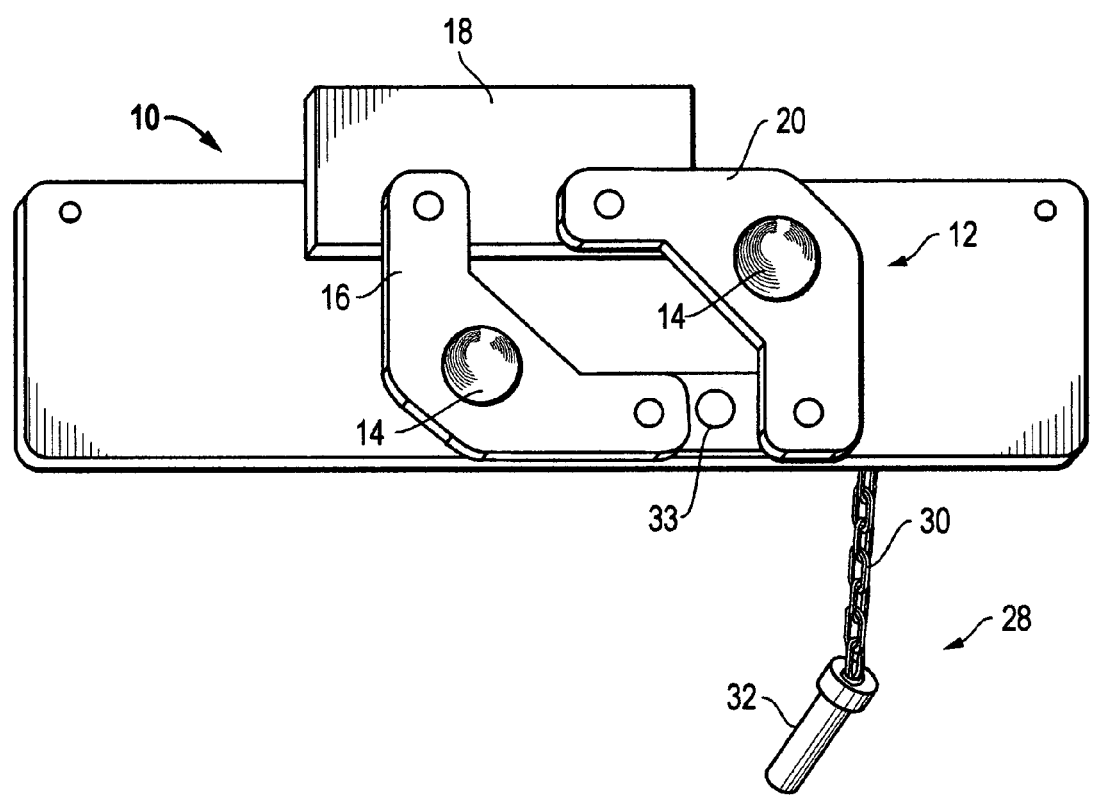
FIG. 3 is a top view of the present invention illustrating the use of the invention with two hitches of different dimensions in a second position.

As can now be readily seen, when a user desires to switch from the 2 inch ball hitch 14B in the towing position illustrated in FIG. 1, the user simply lifts pin 32. This frees first swing arm 16 and second swing arm 20 to rotate around swing arm pins 22 while being held in spaced apart relation by hinge bar 24. As illustrated in FIG. 3, once the swing arms have been fully rotated such that 1⅞ inch ball diameter hitch 14A is in the towing position, pin 32 is inserted into pin hole 33 to hold the swing arms in that new chosen position.

As will be apparent to any person of ordinary skill in the art, immobilizing device 28 may be any securing device for securing movable hitch attachment 12, first swing arm 16 and second swing arm 20, in a desired location. Such a swing arm locking device could include a locking pin used in conjunction with holes drilled in the swing arms and support 18 for example only.

Figure 4:
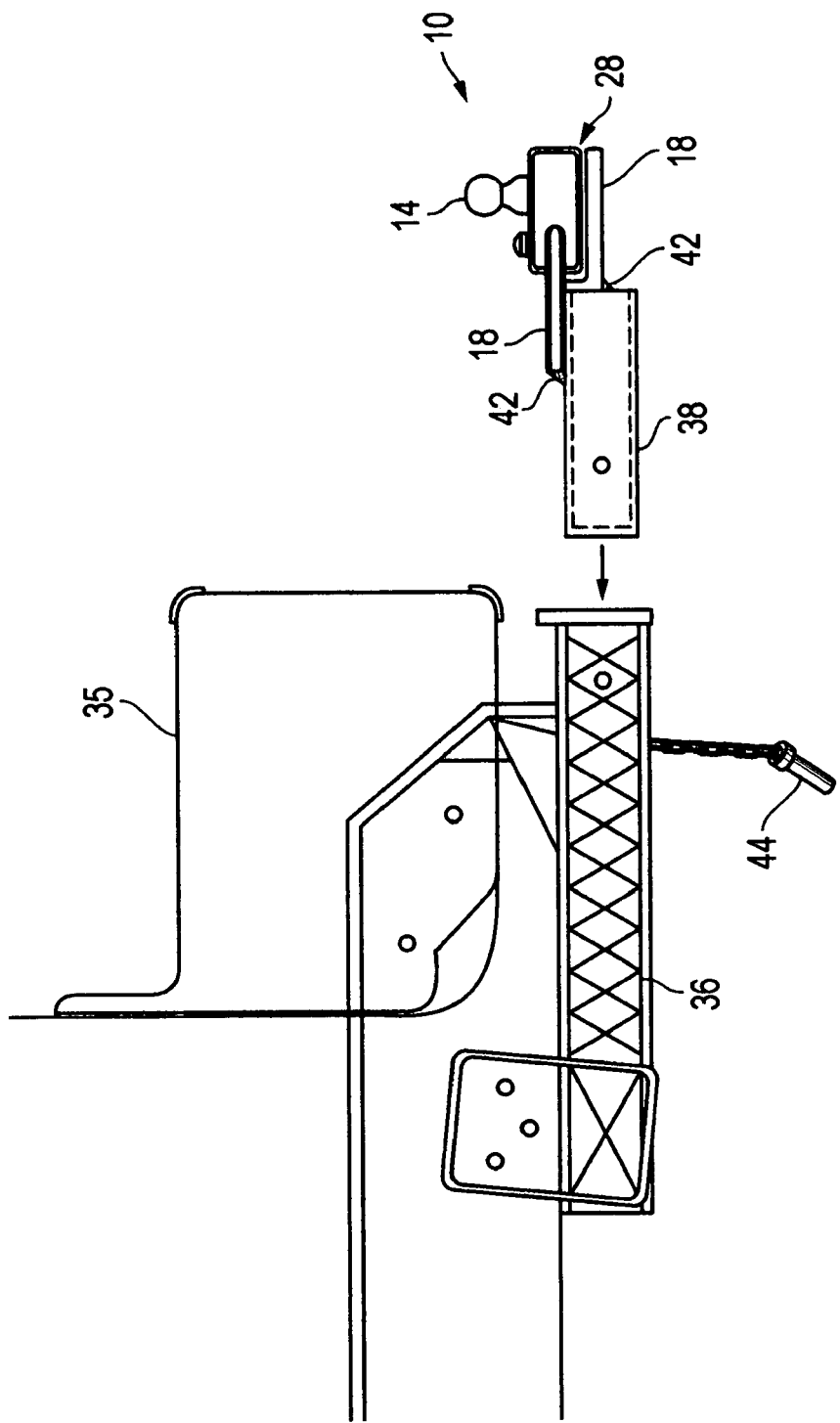
FIG. 4 is aside view of the invention configured so as to be used with an existing receiver hitch.

FIG. 1 illustrates multi-hitch apparatus 10 connected to a support 18 that may be connected directly to the bumper of a vehicle (not shown) by use of bumper holes 34 that are conformed to commonly placed bumper holes in commercial and recreational vehicles. Multi-hitch apparatus 10 may be connected to the bumper by means of bumper holes 34 by any means known in the art such as by nut and bolt combinations or welding, for example only. Other means of connecting multi-hitch apparatus 10 to a vehicle are possible. FIG. 4 shows multi-hitch apparatus 10 conformed to be connected to an existing receiver hitch 36. In this case, receiver hitch 36 receives an insert 38 to which multi-hitch apparatus 10 is connected as will be more fully discussed hereafter with regard to FIG. 4. Again, multi-hitch apparatus 10 may be connected to the vehicle in any manner now known or hereafter developed.

Figure 2:
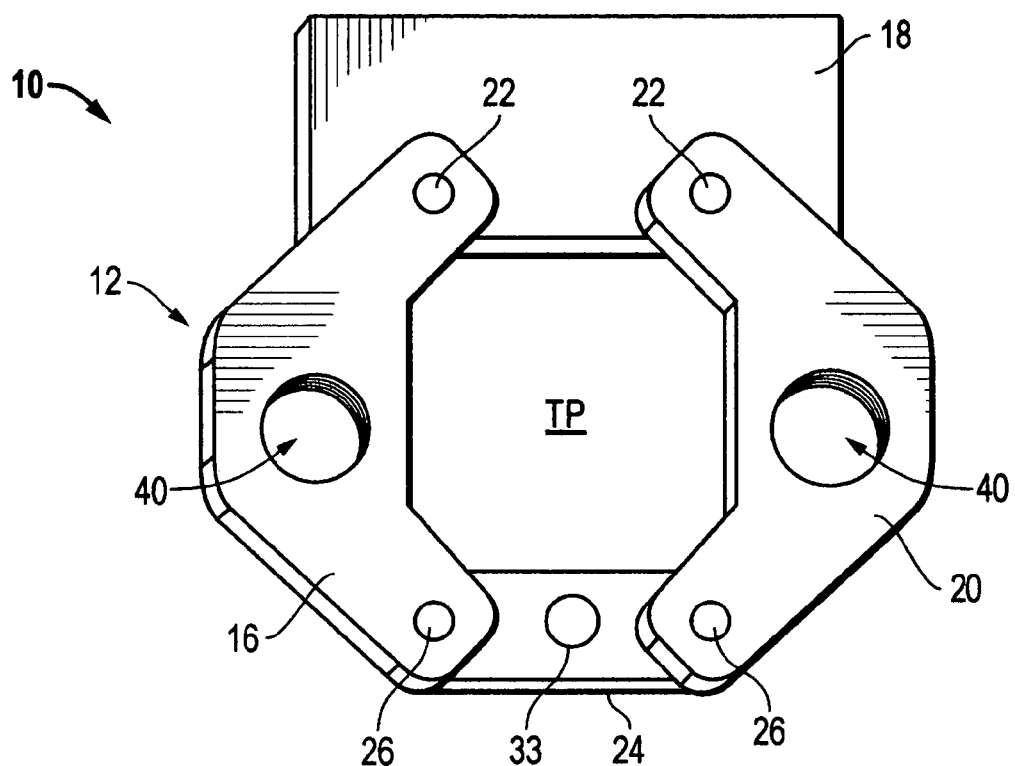
FIG. 2 is a top view of the swing arms of the present invention without a hitch attached to either arm in a neutral position.

Referring now to FIG. 2, movable hitch attachment 12, including first swing arm 16 and second swing arm 20, are shown movably connected by swing arm pins 22 to support 18. Further, hinge bar 24 is shown movably connected by hinge bar pins 26 to both swing arm 16 and swing arm 20. As a result of this configuration, first swing arm 16 and second swing arm 20 arm held in a spaced apart relationship from each other. FIG. 2 illustrates the "neutral" position of the swing arms. That is to say, FIG. 1 shows the swing arms in a first position whereas FIG. 3 shows the swing arms in a second position, the swing arms having rotated counterclockwise from the position in FIG. 1 to the second position illustrated in FIG. 3. All the while, the swing arms are held in the spaced apart position as illustrated. Referring to FIG. 2 in this "neutral" position reveals the preferred "towing position" indicated by the letters "TP". The TP position is the towing location whereby the selected hitch 14 is held in position by immobilizing device 28 for proper towing.

FIG. 2 also illustrates another embodiment of the invention whereby swing arms 16 and 20 include threaded receiving holes 40. That is to say, swing arms 16 and 20, in this embodiment, include a hole with threads such that various size hitches 14 may be screwed into threaded receiving holes 40 and removably held in place thereby. As a result, a user can carry an assortment of various size hitches 14 for use as desired and needed.

Referring now to FIG. 4, the versatility a multi-hitch apparatus 10 of the present invention is illustrated. In FIG. 4, as has previously been discussed, multi-hitch apparatus 10 has been attached to insert 38 by means of a weld 42, for example only and not by way of limitation. FIG. 4 serves to illustrate that multi-hitch apparatus 10 can be utilized with any box tubing bracket receiver hitch 36 now known or hereafter developed. Additionally, as is obvious to any person of ordinary skill in the art, multi-hitch apparatus 10 may be welded directly to a vehicle bumper 35 or attached to a vehicle or any other item as desired. As shown in FIG. 4, once insert 38 is inserted into receiver hitch 36, a receiver pin 44 is used to hold insert 38 in place, all as known in the art.

By way of further explanation, multi-hitch apparatus 10 of the present invention is designed for the user to be equipped with two ball hitch 14 sizes attached to movable hitch attachment 12 at all times. Basic ball sizes are 1⅞ inches and 2 inches, but obviously the sizes are not limited and any desired hitch size and/or shape now known or hereafter developed is accommodated by way of the invention. Once again, multi-hitch apparatus 10 can be manufactured to fit any vehicle bumper 35, step bumper, or the like, or any vehicle with an existing receiver hitch 36, for example only and not by way of limitation.

Once the multi-hitch apparatus 10 is attached, then changing from one size hitch to another size hitch is simple, quick, and secure. Applicant has determined that it is a three-step, five second process to complete. A user first attaches the multi-hitch apparatus 10 as discussed above. Starting with a hitch 14 in a first position, the change to another hitch requires simply releasing immobilizing device 28, rotating the desired hitch into the towing position, TP, and securing the movable hitch attachment 12 in the selected position. When threaded receiving holes 40 are used, a user has as many options for the hitch size and diameter and shape as are possible.

The description of the present embodiments of the invention have been presented for purposes of illustration but are not intended to be exhaustive or to limit the invention to the form disclosed. Many modifications and variations will be apparent to those of ordinary skill in the art. For example only, hitches other then "ball" hitches may be used, other devices for locking the movable hitch attachment 12 in a particular position are possible and other locations for the use of the multi-hitch apparatus 10 apart from vehicle bumpers 34 are encompassed within the scope of the invention. As such, while the present invention has been disclosed in connection with the preferred embodiments thereof, it should be understood that there may be other embodiments which fall within the spirit of the invention as set forth in the following claims.

What is claimed is:

1. A two ball hitch apparatus comprising:
   a) a first arm rotatably connected to a vehicle;
   b) a second arm rotatably connected to said vehicle and to said first arm;
   c) a first ball hitch connected to said first arm; and
   d) a second ball hitch connected to said second arm.

2. The apparatus of claim 1 further comprising an arm immobilizing device.

3. The apparatus of claim 1 wherein said first ball hitch is of one diameter and said second ball hitch is of another diameter.

4. The apparatus of claim 1 wherein said first ball hitch is of one diameter and said second ball hitch is of another diameter and wherein said ball hitch diameters are selected from a group including: 1 and ⅞ inch diameter and 2 inch diameter.

* * * * *